US012136306B2

(12) United States Patent
Mukherjee

(10) Patent No.: US 12,136,306 B2
(45) Date of Patent: Nov. 5, 2024

(54) LOCKING SYSTEM FOR PORTAL

(71) Applicant: Somnath Mukherjee, Milpitas, CA (US)

(72) Inventor: Somnath Mukherjee, Milpitas, CA (US)

( * ) Notice: Subject to any disclaimer, the term of this patent is extended or adjusted under 35 U.S.C. 154(b) by 271 days.

(21) Appl. No.: 17/744,928

(22) Filed: May 16, 2022

(65) Prior Publication Data

US 2022/0366749 A1 Nov. 17, 2022

Related U.S. Application Data

(60) Provisional application No. 63/189,620, filed on May 17, 2021.

(51) Int. Cl.
*G07C 9/00* (2020.01)
*E05B 47/00* (2006.01)

(52) U.S. Cl.
CPC ...... *G07C 9/00944* (2013.01); *E05B 47/0002* (2013.01); *G07C 9/00309* (2013.01); *E05B 2047/0048* (2013.01)

(58) Field of Classification Search
CPC ....... E05B 47/00; E05B 47/0001–0005; E05B 47/0046; E05B 47/0047; E05B 2047/0048; G07C 9/00; G07C 9/00944; G07C 9/00309; G07C 2009/00317; G07C 2009/00325; G07C 2009/00333
USPC ........................................................ 70/278.2
See application file for complete search history.

(56) References Cited

U.S. PATENT DOCUMENTS

2010/0318685 A1* 12/2010 Kraus ................. H04L 12/2834 709/249
2019/0387104 A1* 12/2019 Yssa .................. G07C 9/00309
2020/0160632 A1* 5/2020 Kirkjan .............. G07C 9/00182

FOREIGN PATENT DOCUMENTS

CA 2908614 A1 * 11/2014 ............... A61B 5/01
CA 3140316 A1 * 1/2021 ............ G06Q 10/02
KR 20150053281 A * 5/2015
WO WO-2020254326 A1 * 12/2020 ............ E05B 15/10

* cited by examiner

*Primary Examiner* — Nathan Cumar
(74) *Attorney, Agent, or Firm* — The PL Law Group, PLLC

(57) ABSTRACT

A system according to an embodiment includes electronic lock and key of which the electronic lock can be installed on a portal such as a door. The electronic lock is capable of contact-less authentication of the electronic key carried in person by a user, and also determines the open/close condition of the door panel with respect to the door frame. Being an add-on, there is no need to replace or modify the existing mechanical lock at the door. The electronic key does not require any batteries to operate, being powered by the electronic lock through wireless transfer of power through the door panel. After a successful authentication of the electronic key, the electronic lock clears the user to open the door. An attempted illegal entry by force or using duplicate key of the mechanical lock without electronic authentication is considered intrusion. Once an intrusion is detected, the system generates an alarm at the premises as well informs multiple mobile devices (e.g., cell phone) anywhere in the world through a wireless network. The electronic lock can be powered by a battery or AC source depending on the installation scenario.

10 Claims, 12 Drawing Sheets

LOCKING SYSTEM FOR PORTAL

PRIORITY

This application claims the benefit of U.S. Provisional Patent Application No. 63/189,620 filed on May 17, 2021 the disclosures of which are incorporated herein by reference for all purposes.

BACKGROUND

1. Field of the Invention

The present invention relates to the field of home or enterprise security. More specifically, the present invention is directed to a locking system for door and likes which will allow its end user to be aware of unlawful opening of such doors by force or by using any duplicate key. It ensures that only authorized personnel carrying an authentication device can open the doors.

2. Background of the Invention

Vast majority of homes, stores and enterprises worldwide are protected by mechanical lock and key devices. These mechanical locks are designed to be opened by matching keys or combination codes. Such traditional locks are relatively easy to breach by creation of a duplicate key or other means. Moreover, the end user who is away has no means to determine if an intrusion has indeed taken place.

Recently there have been attempts to integrate biometric sensors (e.g., fingerprint, iris etc.) with locks. However, they are locked to a set of individuals and it is difficult to admit a person outside the repertoire. More exotic authentication techniques like voice recognition are prone to failure if the end user becomes pre-disposed with illness affecting speech pattern.

The so-called smart-locks (or intelligent locks) incorporate power of electronic computing and communication, enabling the locks to be opened remotely from personal mobile devices (e.g., smart phones) and is capable of informing the user of an intrusion. However, it requires the existing mechanical lock on the doors to be replaced, a feature that is often inconvenient and undesirable. Replacing the existing mechanical locks makes installation more elaborate, and also may reduce the overall lock strength as multiple mechanical locks are often used to enhance lock strength. Since smart-locks contain a remotely operated moving part (motor or electromagnetic actuator), such devices tend to draw significant current and thereby limit the battery life unfavorably. Electromechanical parts like motor could become unreliable under extreme weather conditions and has limited lifetime characteristic of systems with moving parts. Moreover, there is a chance of getting locked out if the battery in the personal mobile device runs out of charge or a power outage occurs in the premises.

Furthermore, the so-called smart-locks have their human interaction devices (e.g., keypad, camera, biometric sensor, etc.) exposed to the outside that are vulnerable to vandalism. In addition, they are often susceptible to cyber hacking.

It is thus there has been a need for developing a new locking system for doors which can solve the above problems and does not require replacement of the existing lock but provide all the desirable attributes of the smart-lock.

It is thus the basic object of the present invention to develop a locking system for door and likes (broadly describes as 'portals') which will allow its end user to be aware of unlawful opening of such doors by force or use of any duplicate key.

Another object of the present invention is to develop a locking system for door and likes which will not require replacement of the existing lock, but merely adding an extra unit behind the door.

Another object of the present invention is to develop a locking system for door and likes which will allow only authorized personnel carrying an authentication device to open the doors.

Yet another object of the present invention is to develop a locking system for door and likes with low operational power requirement.

Yet another object of the present invention is to develop a locking system for door and likes that is not visible from outside and therefore cannot be vandalized easily.

Yet another object of the present invention is to develop a locking system for door and likes that is robust against cyber hacking.

A still further object of the present invention is to develop a locking system for door and likes which will perform additional operation including determination of door open/close status, issuance of alarm and non-alarm signals, issuance of intrusion detection information remotely to end user using cellular or similar network and like.

SUMMARY

Thus, according to the basic aspect of the present invention there is provided a locking system for a portal to enable its authorized user to open the portal or aware authorized user on unlawful opening of such portal comprising an electronic lock for secured internal installing on a fixed portion of the portal;

an auxiliary resonator for mounting on a movable portion of the portal, the auxiliary resonator is configured to wirelessly interact with the electronic lock and one or more of electronic keys;

each electronic key on close proximity with the auxiliary resonator is wirelessly energized for communication with the electronic lock via the auxiliary resonator including transmission of unique embedded code of the electronic key to the electronic lock;

the electronic lock involves a processor unit to match and authenticate the electronic key code by matching the electronic key code with pre-programmed codes and allow the user to open the portal on matching of the codes and/or generate status of portal opening without electronic key or with electronic key but without matching key code.

In the present locking system, the auxiliary resonator is mounted on moving door/window panel adapted to be read through the door/window panel material whereby the electronic Lock in its entirety is installed on static door/window frame externally unnoticeable and powered by battery backed AC mains supply.

In the present locking system, the auxiliary resonator includes a printed or copper wire based multi-turn planar spiral inductor and a parallel capacitor.

In the present locking system, the electronic lock comprises at least one authentication cum open-close sensor for mutual inductance based wireless interaction with the electronic key on proximity with the auxiliary resonator involving the auxiliary resonator as passive repeater, while mutual inductance based wireless interaction between the auxiliary resonator and the authentication cum open-close sensor facilitates determination of open-close condition of the portal.

In the present locking system, the electronic lock further comprises at least one audio-generator to create various tones including welcome sound, intrusion alarm, instruction to close the portal;

at least one wireless modem to convey intrusion information to users' personal devices through a local or wide area wireless network; and a power management unit to optimize overall power consumption by the electronic lock.

In the present locking system, the authentication cum open-close sensor comprises

- a resonant circuit comprising of a multi-turn planar spiral inductor and a parallel capacitor, the inductor generates a magnetic field directed to the auxiliary resonator for mutual inductance based wireless communication with the auxiliary resonator involving the mutual inductance between the inductor of the authentication cum open-close sensor and the inductor of the auxiliary resonator and further mutual inductance based wireless communication with the electronic key involving the mutual inductance between the inductor of the auxiliary resonator and inductor of the electronic key;
- a cooperative transistor based tuned amplifier having the transistor under common base/common gate configuration and a radio frequency source capable of amplitude modulation to excite the transistor, enabling transmission of data from the authentication cum open-close sensor to the electronic key via the auxiliary resonator, wherein data from the electronic key is transmitted to the authentication cum open-close sensor via the auxiliary resonator by load modulation including modulation of effective RF load at collector/drain of the transistor and modulation of the RF voltage at the collector/drain of the transistor;
- an envelope detector to generate envelope of the RF voltage containing the load modulation information and also a DC component depending on distance and orientation of the electronic key with respect to the inductor of the auxiliary resonator;
- an adaptive slicer to recover the load modulation information irrespective of the DC component and convert to digital data equivalent to the data generated by the electronic key; and
- a cooperative comparator to generate logic level signal depending on the voltage from the envelope detector indicating the door open/close condition created by moving the auxiliary resonator sufficiently far away from the resonant circuit of the authentication cum open-close sensor.

In the present locking system, the electronic Key comprises a resonant circuit tuned to frequency generated by radio frequency source of the authentication cum open-close sensor consisting of the inductor and a capacitor, the inductor is magnetically coupled with the inductor of the authentication cum open-close sensor resonant circuit through the inductor of the auxiliary resonator on their proximity to harvest power from the magnetic field generated by the inductor of the authentication cum open-close sensor resonant circuit for a power detector;

the power detector preferably an envelope detector or charge pump to generate higher voltages having capacitance to hold charge during the load modulation whereby DC voltage generated by the power detector is used to power the circuitry inside the key;

a fast envelope detector to detect the data transmitted from the electronic Lock via amplitude modulation;

comparator to convert the detected signal into digital data;

non-volatile memory to store factory-programmed unique code of the key for processing by a processor and serially outputting;

an electronic switch for performing the load modulation to transmit the serially outputted data containing the unique code of the key in different transmitting bit patterns.

In the present locking system, the processor unit on matching of the received key code with one of the pre-programmed codes, cooperates with the lock on the portal allowing the user a reasonable time to open the lock, while the processor unit on detection of the door/window opening without receiving the key code or without matching of the received key code with any of the pre-programmed codes generates audio alarm signal and send warning message to one or more of authorized users of the door/window using a wireless network.

In the present locking system, the power management unit optimizes overall power consumption of the electronic lock by periodically activating the authentication cum open-close sensor and activating the processor unit for requisite processing only when the door/window open condition or presence of the electronic key is detected;

wherein the processor unit further activates the audio generator and the wireless modem depending on the requirement and turn off all the circuitry including itself on completion of the processing.

In the present locking system, the power management unit includes a mechanical switch accessible from outside of the electronic lock for switchable selection between optimizing the overall power consumption by electronic lock or running continuously all the circuitry of the electronic lock.

In the present locking system, the power management unit optimizes overall power consumption by the electronic lock by including

- the mechanical switch to select the normal power optimized operation of the electronic lock which turns off the sensors circuitry, processor, audio generator and the wireless modem in co-operation with a one-bit memory that assumes a certain state once power is applied and change to a different state if the sensors detect presence of an electronic key or portal open condition;
- a Low Duty Cycle Oscillator (LDCO) to create a square wave with low duty cycle such as to wake up the sensors periodically;
- the one-bit memory holding its changed state and maintain the processor turned on and further turn on the transmitter of the wireless modem depending on the output from the processor but keep the receiver disabled in the wireless modem ensuring total protection against remote hacking;
- turn off sensors circuitry and the wireless modem on command from the processor and finally turn off the processor itself after a certain delay by the same command traveling through an analog delay.

In the present locking system, the electronic lock is configured to convert output from sensors like camera, temperature sensors, smoke detectors, motion sensors into versatile security elements;

wherein multiple of the security elements are configured to be connected in a network to cover an entire premise;

wherein the security elements are configured to communicate directly to a gateway which contains a wireless modem for backhaul.

DETAILED DESCRIPTION

Figure 1:
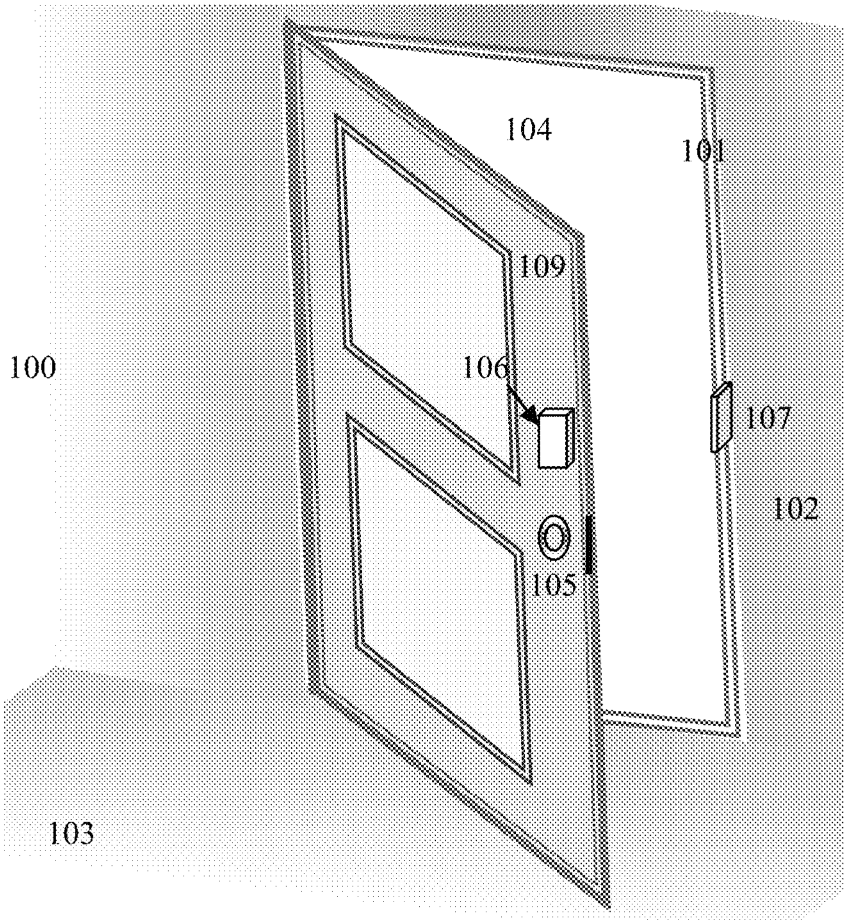
FIG. 1 depicts a typical installation of electronic Lock system on the door in accordance with an embodiment of the present invention.

As stated hereinbefore, the present invention discloses a new and useful locking system for a portal which is simpler in construction, more universally usable and more versatile in operation than known apparatus of this kind. The locking system of the present invention comprises two parts viz. a static unit and a mobile unit. The static unit (also called the electronic lock) is operated by battery or AC power, and installed on the portal such as door/window at a convenient location behind the door/window. The installation is add-on and there is no need to replace the existing lock in operation. There is an adjunct to the static unit that is installed at a convenient location by the door frame, and is used by the static unit to detect the open/close condition of the door. This adjunct does not require any power source to operate. The mobile unit, (also called the electronic key or fob) is carried in person by the end user. It requires no battery or similar power source, and is powered wirelessly by the static unit (aka the electronic lock) when brought in close proximity.

Each fob carries a unique code and is used for authentication by the electronic lock. In other words, the electronic lock allows entry only to a finite number codes from various fobs. The unique code in each fob is hard coded and cannot be changed by the user. On the other hand, the electronic lock—issued to a certain user—can be remotely programmed to accept a certain number of codes. In other words, although the fob code is hardcoded, the matching code in the electronic lock can be changed (programmed) remotely.

More than one fob can possess the same code, enabling different individuals to be granted access through a particular door.

An individual carrying a fob reaches a secured portal (i.e., one containing an electronic lock installed on the inside region of the portal) and presents the fob within a designated region outside the secured portal. As a result, the fob enters within the operating volume of the electronic lock that extends to outside region of the door. Once inside the operating volume, the fob gets energized wirelessly by the electronic lock. The fob then wirelessly transmits its unique embedded code that is received by the electronic lock. The electronic lock verifies whether the code matches with one of the pre-programmed codes within it. If there is a match, the electronic lock informs by an audible/visual welcome signal that authentication has succeeded and entry is allowed. Without a match, authentication is considered a failure and no welcome signal is generated to indicate allowed entry to the premises. If the individual enters the premises through the secured door without authentication, electronic lock considers the situation to be an intrusion. Intrusion might occur in several instances, e.g., entry without any fob or unmatched fob, entry by break-in, entry by duplicate key of the mechanical lock but without electronic authentication etc. If an intrusion is detected, an audio alarm signal is generated by the electronic lock. At the same time, a warning message is sent to one or more users using a wireless network such as the cellular network. Networks other than cellular (e.g., Sigfox, LoRa, NBIoT etc.) to convey the message is also possible.

If authentication is successful, the user is allowed a reasonable time to open the existing mechanical lock, then open the door and enter the premises. If the user forgets to close the door after entering, a warning signal is issued by the electronic lock reminding the user to close the door. If the door is kept open for a sufficiently large duration, electronic lock interprets the situation as intrusion, and corresponding steps (i.e., generation of alarm and sending message) are taken.

If a fob is reported misplaced or stolen, that particular code is removed from the corresponding electronic lock(s) as well as from the universal data base. Removal from the universal data base ensures that a stolen fob cannot be used anywhere in the world. A new code instead replaces the code of the misplaced or stolen fob, and the electronic lock(s) are remotely reprogrammed to accept this changed code. Furthermore, new fobs with the freshly issued code are also issued.

To save power, the electronic lock does not operate continuously but in a duty cycled mode. In other words, it normally stays asleep, but periodically wakes up and checks if a fob is present in its operating volume, or if the door has been opened. If any of the above conditions are found true, the electronic lock turns on its internal circuitry to process information further, viz. determine whether the situation is one of intrusion or not and take appropriate action.

The interaction between the fob and electronic lock is by way of magnetic coupling. The electronic lock generates a magnetic field that is used by the fob to power its internal circuitry. The fob circuitry communicates its built-in code by means of load modulation to the electronic lock. As the range for near field communication is limited, it is extremely difficult for an eavesdropper to sense the communication between the fob and the electronic lock. This makes the system inherently immune to electronic eavesdropping and jamming. For added security, a key exchange protocol may be implemented between the fob and the electronic lock.

The door sensor is also based on magnetically coupled Near Field Communication. It may operate at a frequency different from the fob sensor or both may use the same frequency multiplexed in time, or using a special antenna configuration. The adjunct to the electronic lock mentioned earlier is in fact a passive resonator with a high quality (Q) factor. The door sensor current depends on the separation (hence magnetic coupling) between the resonator and the door sensor. This principle is used to determine whether the door is open or closed.

The foregoing has outlined, in general, the physical aspects of the invention and is to serve as an aid to better understanding the more complete detailed description that is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

Reference is now invited from the accompanying FIG. 1 which depicts a typical overall installation 100 of the Electronic Lock 106 mounted on a door panel 109. The door frame 101 is supported by walls 102 and rests on floor 103.

The Electronic Lock 106 is mounted on door panel 109 inside the premises and therefore not visible from the outside region 104 provided the door is made from opaque material such as wood. There is no need to modify the existing mechanical lock 105. The numeral 107 is an additional status indicating unit mounted on a suitable location (e.g., door frame) and it is used to determine the open/close status of the door. It does not require any power to operate.

Figure 2:
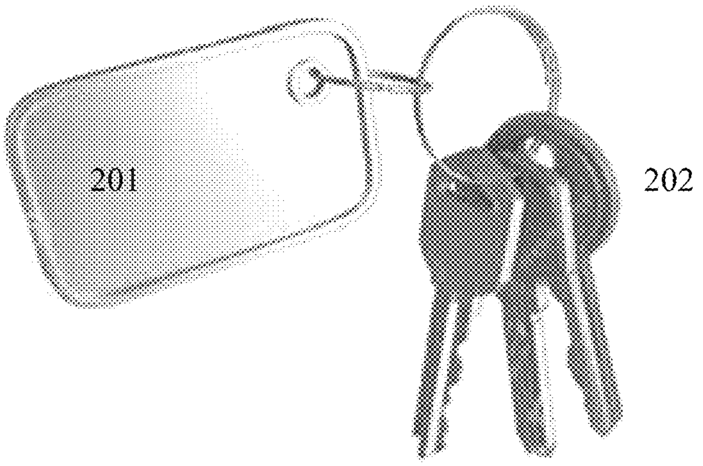
FIG. 2 depicts an electronic key (Fob) in association with mechanical keys cooperative to the electronic Lock system on the door in accordance with an embodiment of the present invention.

The accompanying FIG. 2 depicts an electronic key fob 201 in association with keys 202 of a typical mechanical lock. The user needs to carry fob 201 in person just as the mechanical keys 202.

Figure 3:
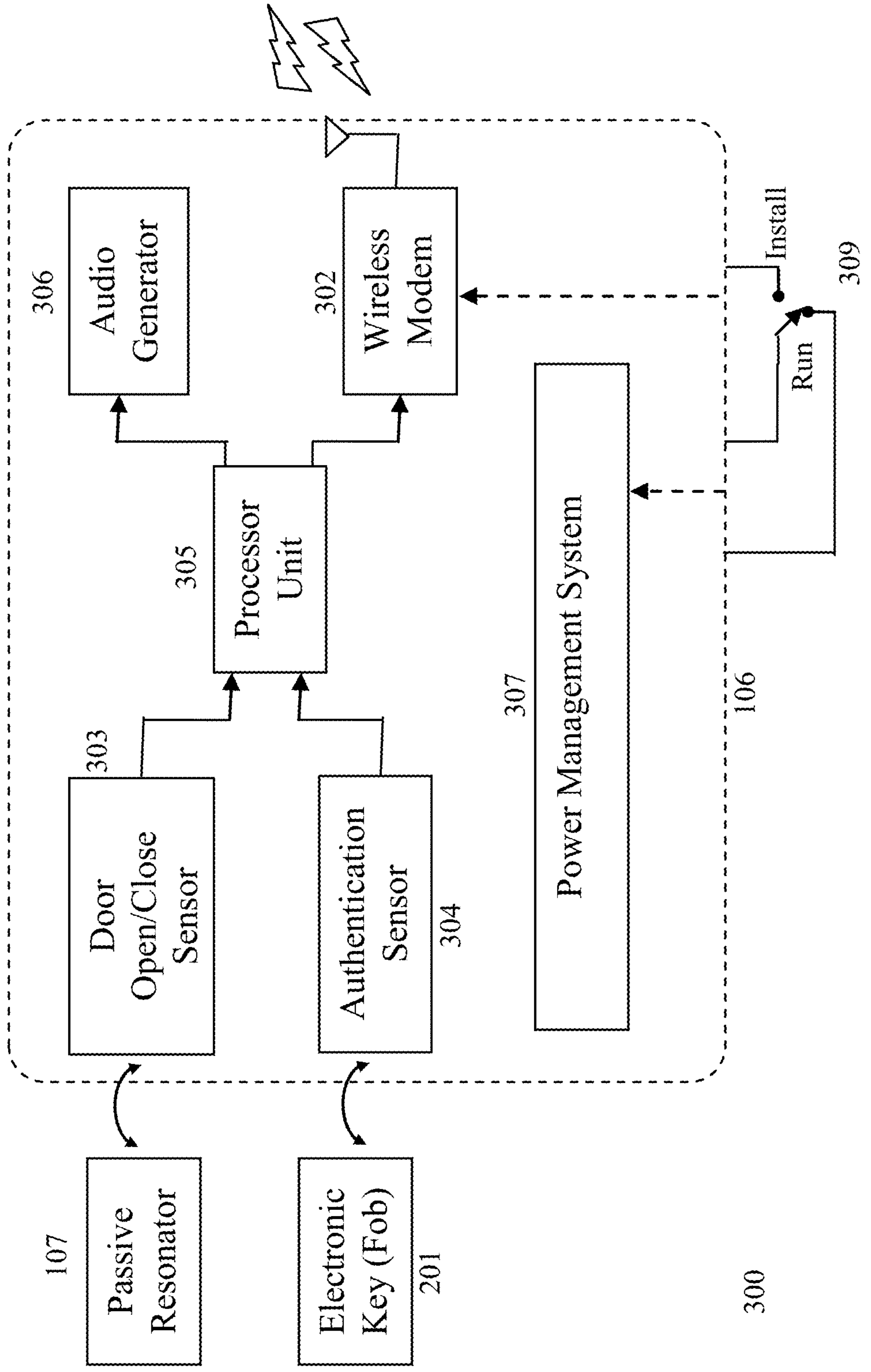
FIG. 3 depicts overall block diagram of the electronic Lock system in accordance with an embodiment of the present invention.

The FIG. 3 depicts an overall block diagram 300 of the Electronic Lock system. The Electronic Lock 106 is depicted within dotted lines. Passive resonator 107 (referred to in FIG. 1) is essentially a resonant circuit with low losses, and is mounted at a convenient spot somewhere near the door frame as in FIG. 1. When the door is closed, the Electronic Lock 106 and Passive Resonator 107 are in close proximity (strong magnetic coupling), and the radio-frequency (RF) current through Door Open/Close Sensor 303 is small. The same current is increased when door is open, i.e., 107 and 303 are weakly coupled. This change in RF current is used to determine open/close condition of the door.

The Authentication Sensor 304 communicates with Electronic Key (Fob) 201 in a contactless manner through the door made of non-metallic material like wood, glass, fiber glass or other dielectric material. The Authentication Sensor 304 generates a magnetic field that is used by 201 to harvest power and operate its internal circuitry. In other words, 201 does not require the use of a primary power source like battery. The communication from 201 to 304 is done via load modulation, while that from 304 to 201 can be done by modulating the carrier generated by 304. Each Fob 201 has a factory programmed unique code that is transmitted to 304. Processor Unit 305 compares this code with the set of allowed codes within its memory. If there is a match, authentication is considered to be successful.

The audio generator 306 is used to create various tones like welcome sound, intrusion alarm, instruction to close door etc. It might be also used issue such signals in the form of synthetic human voice.

The wireless backhaul, carried out by Wireless Modem 302, is used to convey intrusion information to users' personal devices through a wide area wireless network e.g., cellular networks like GSM, CDMA, LTE etc. or IoT network like LoRa, Sigfox, NB-IoT etc. It may also be used to connect wirelessly to a local area network (LAN) through protocols like Bluetooth, Wi-Fi etc.

The Power Management System 307 optimizes overall power consumption by Electronic Lock 106. A circuitry consuming miniscule power stays on 24/7, with everything else being turned off. The Power Management System 307 wakes up sensors 303 and 304 periodically. If a door open condition or presence of a Fob 201 is detected, the Processor Unit 305 is made to wake up and perform the requisite processing. If necessary, the Processor Unit 305 wakes up additional circuitry e.g., Audio Generator 306 and Wireless Modem 302. Once the processor's activity is completed, it turns all other circuitry and eventually itself off. The numeral 309 is a mechanical switch accessible outside the Electronic Lock 106. It can be used to select between 'Run' and 'Install' modes. For the normal operation of the system, the switch is set to 'Run' mode whereby Power Management System 307 is in effect and current consumption of 106 is low. Also, in this mode, the receiver of the Wireless Modem 302 is disabled, thereby preventing any hacking attempt from undesired sources. The transmitter of the Wireless Modem 302 is enabled on demand, ensuring transmission of messages to the outside world. The switch is set to 'Install' mode only during provisioning (i.e., configuring parameters) of the Electronic Lock 106, i.e., for setting parameters like allowable Fob codes, phone numbers etc. After the provisioning is complete, 309 is reverted back to the 'Run' mode. During the 'Install' mode, Power Management System 307 is disabled and the entire circuitry of the Electronic Lock stays on continuously. Moreover, receiver of the Wireless Modem 302 is enabled, enabling remote commands through wireless link to effect changes in 106 (provisioning) from authorized personnel only.

Figure 4:
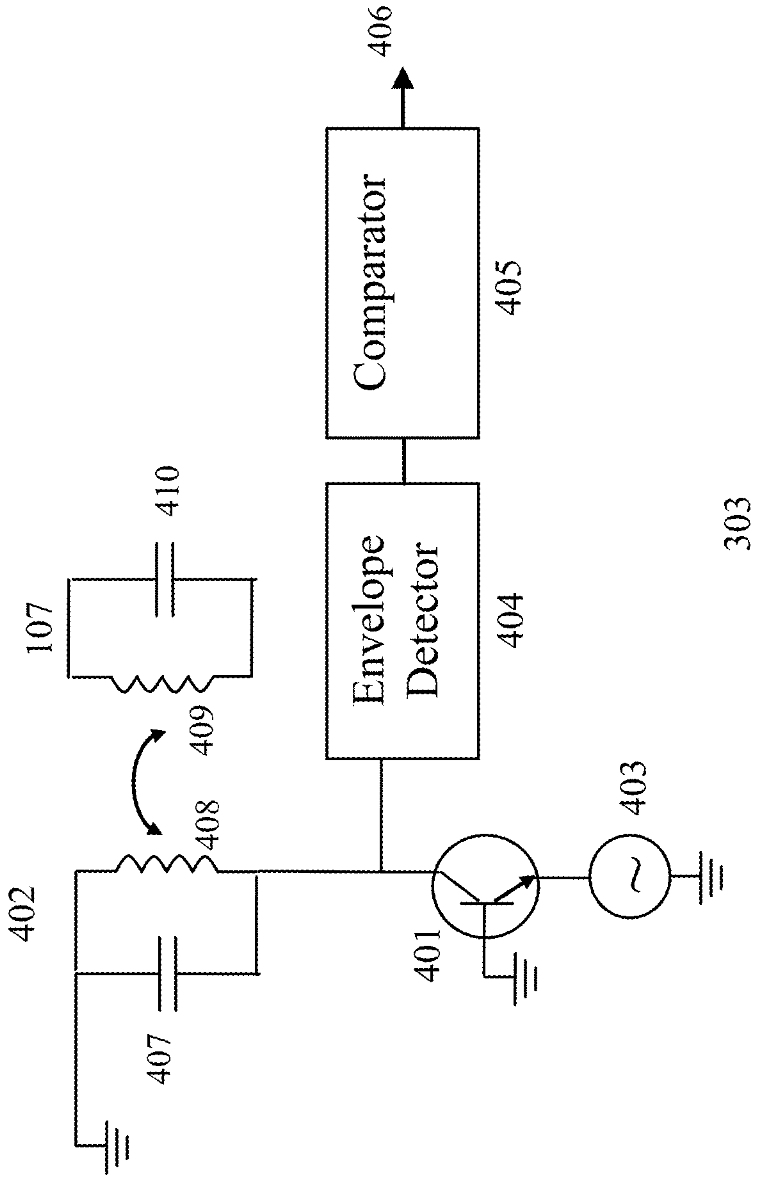
FIG. 4 depicts block diagram of the Door open/close sensor associated with the electronic Lock system in accordance with an embodiment of the present invention.

The accompanying FIG. 4 depicts an embodiment for the door open/close sensor 303 in schematic form (only ac equivalent circuit is shown). A tuned amplifier is created using a transistor 401 (active device) and resonant circuit 402, consisting of multi-turn planar spiral inductor 408 and capacitor 407. The inductor 408 can be created by traces on a printed circuit board (PCB) or using copper wire. Biasing of 401 may be done away from linear mode to save power if some sensitivity can be sacrificed. The diagram shows a bipolar transistor for 401 though a field-effect transistor or a similar device may be used instead. In the present embodiment, the amplifier is common base (common gate), though other configurations (e.g., common emitter/common source) are possible. Common base/common gate is preferred as they provide better overall sensitivity due to reduced loading by the active device 401. 401 is excited by a Radio Frequency (RF) source 403 that can be implemented as a stable oscillator with output buffer. A low loss resonator 107 (also referred in FIG. 1 and FIG. 3 and consisting of multi-turn planar spiral printed inductor 409 and capacitor 410) is magnetically coupled to the inductor 408 of the tuned circuit 402. If the coupling between 107 and 402 is large (i.e., door closed condition), the effective RF load resistance at the collector/drain of 401 is low, resulting in relatively low RF voltage at the collector/drain of 401. If the door is open, 107 moves away from 402 resulting in reduced magnetically coupling between the two. As a result, the effective RF load at the collector/drain of 401 is increased, resulting in increased RF voltage at the collector/drain of 401. The RF voltage at the collector/drain of 401 is detected by an envelope detector 404, followed by a comparator 405 that generates logic level signal 406 depending on the door open/close condition. 107 can be implemented as an inductor implemented in printed circuit board or using copper wire, with a discrete capacitor to resonate. The capacitor can be a lumped component or distributed capacitor in the printed circuit board itself.

Figure 5:
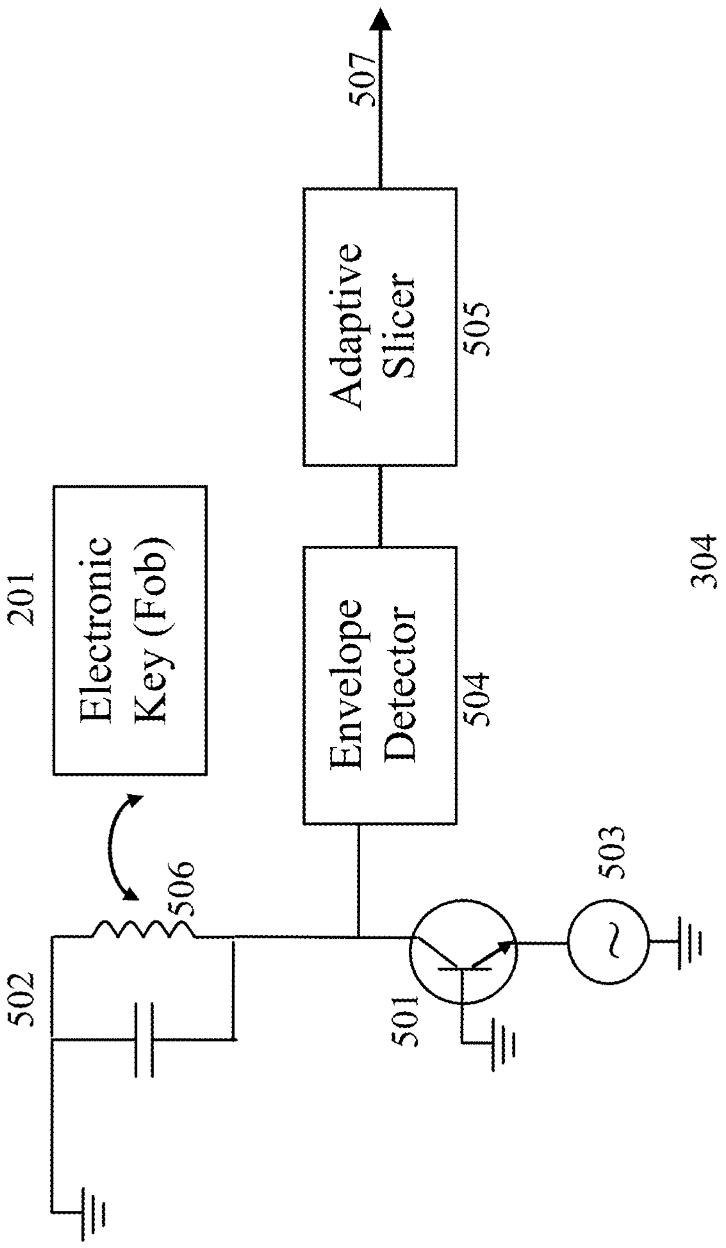
FIG. 5 depicts block diagram of the Authentication sensor associated with the electronic Lock system in accordance with an embodiment of the present invention.

The accompanying FIG. 5 depicts an embodiment of the Authentication sensor 304 in schematic form (only ac equivalent circuit is shown). A tuned amplifier is created using a transistor 501 and resonant circuit 502, consisting of printed or copper wire based multi-turn planar spiral inductor 506 and capacitor 508. Biasing may be done away from linear mode to save power if some sensitivity can be sacrificed. The diagram shows a bipolar transistor though a field-effect transistor or a similar device may be used instead. In the present embodiment, the amplifier is common base (common gate), though other configurations (e.g., common emitter/common source) are possible. Common base/common gate is preferred as they provide better overall sensitivity due to reduced loading by the active device 501. 501 is excited by a Radio Frequency (RF) source 503 that can be implemented as a stable oscillator with output buffer. There is a provision to amplitude modulate 503, whereby data from the Electronic Lock 106 can be transmitted to the Fob 201. An example of this data is a random number generated by the Electronic Lock 106. The Fob 201 is powered by magnetic field generated by the inductor 506 of the resonant circuit 502. Data from Fob 201 is transmitted to Authentication sensor 304 by load modulation. The effective RF load at the collector/drain of 501 is modulated according to the load modulation, modulating the RF voltage at the collector/drain of 501. Envelope detector 504 generates the envelope of this RF voltage containing the load modulation information, but also contains a DC component depending on the distance and orientation (i.e., magnetic coupling) of 201 with respect to 506. An adaptive slicer 505 recovers the modulation irrespective of the undesired DC component and converts to digital data 507, which is ideally same as the data generated by Fob 201. Thus, both upstream (201 to 106) and downstream (106 to 201) communication is effected between Electronic Lock 106 and Fob 201.

Figure 6:
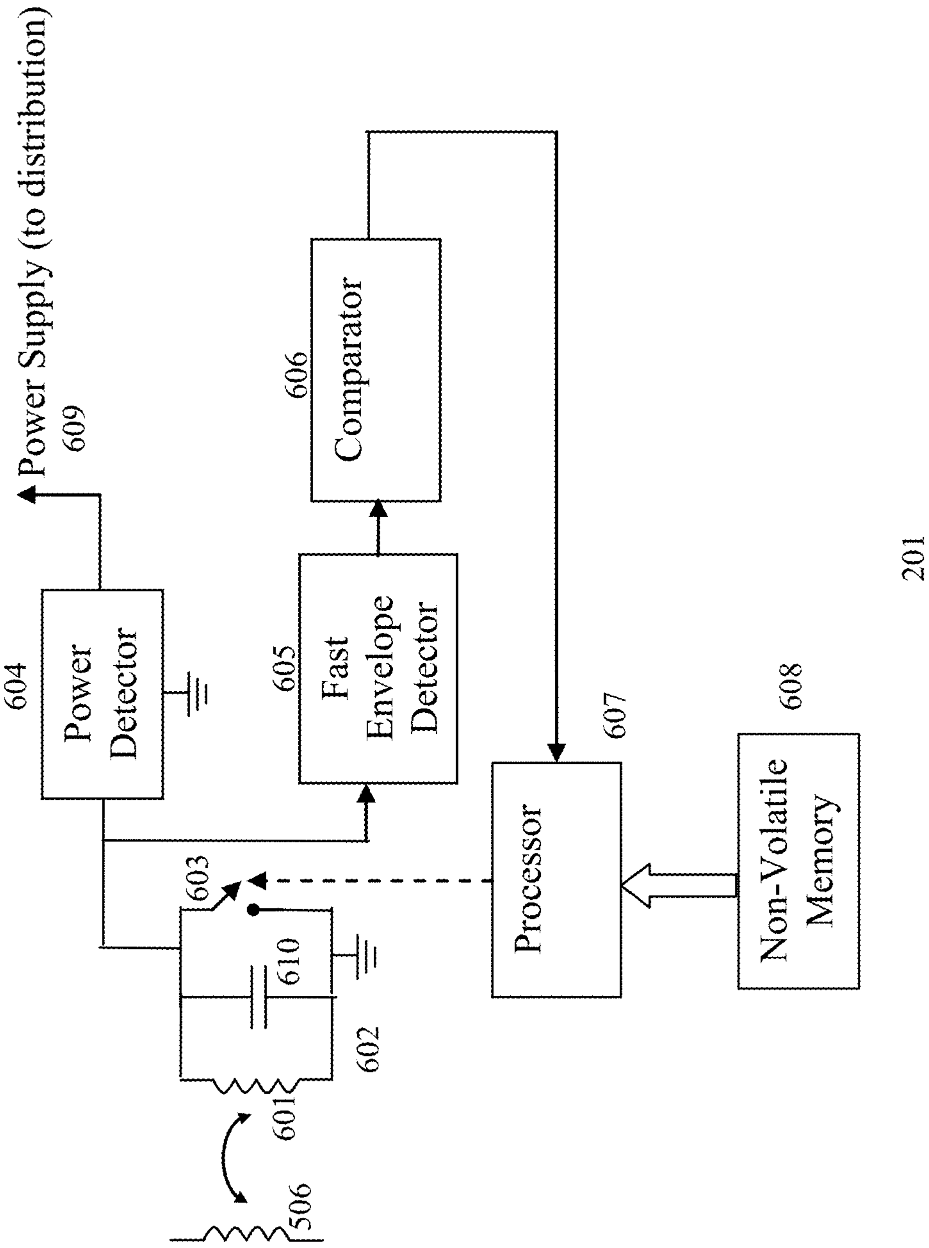
FIG. 6 depicts block diagram of the Electronic Key (fob) in accordance with an embodiment of the present invention.

FIG. 6 depicts an embodiment of the Electronic Key (Fob) 201, powered by magnetic field generated in the inductor 506 in Electronic Lock 106, and without the need for a primary power source such as a battery. 602 is a resonant circuit tuned to the frequency generated by Radio Frequency (RF) source 503 of Electronic Lock 106. The resonant circuit 602 contains a printed or copper wire based multi-turn planar spiral inductor 601 and capacitor 610. The Power Detector 604 can be implemented as a simple envelope detector, or alternative embodiments like charge pump to generate higher voltages. It must have a large enough capacitance to hold the charge during load modulation. The DC voltage 609 generated by 604 is used to power various circuitry inside the Fob 201.

A random number and a polynomial code is generated by the Electronic Lock 106 and transmitted to the Fob 201 using Amplitude Modulation. This information is detected by the Fast Envelope Detector 605 and converted to digital data using the Comparator 606. This information, together with factory-programmed unique code stored in the Non-Volatile Memory 608, is subjected to processing in the Processor 607, outputted serially and performs load modulation using the switch 603. The transmitted bit pattern is different every time the Fob 201 is presented to the Electronic Lock 106, in spite of the fact that the unique code in Fob 201 is fixed and cannot be modified. As a result, it is almost impossible to eavesdrop and decode the unique code.

Embodiment using electronic switch 603 performs amplitude shift keyed (ASK) load modulation, whereas alternative embodiments such as capacitive load modulation, phase shift keying (PSK) etc. may be used as well.

Figure 7:
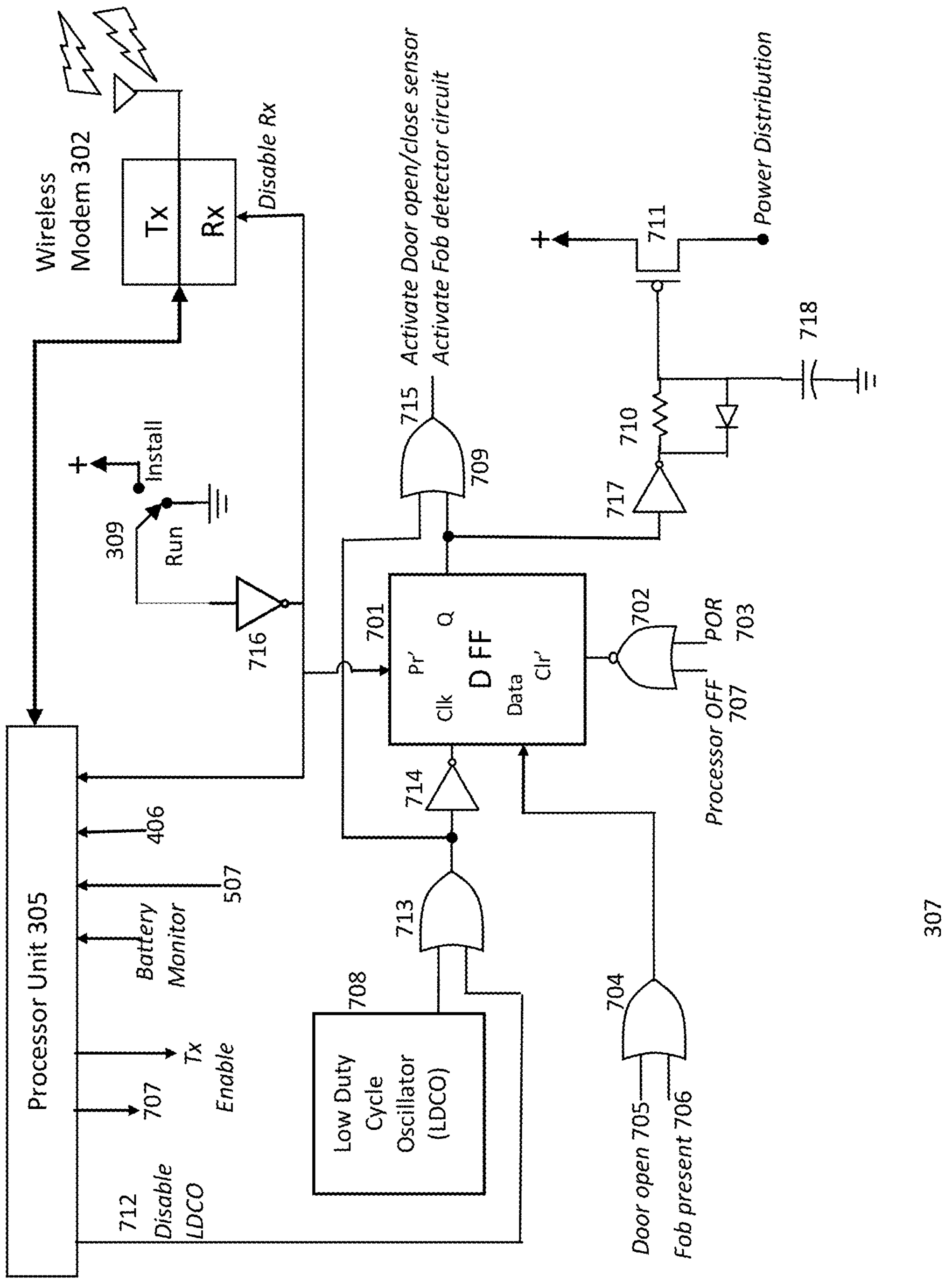
FIG. 7 depicts block diagram of the Power Management System in accordance with an embodiment of the present invention.

The accompanying FIG. 7 depicts an embodiment of the Power Management System. Let us first consider the 'Run' scenario first, when the switch 309 is in 'Run' position, corresponding to the normal operation of the Electronic Lock 106. To start with, Processor Unit 305 and Wireless Modem 302 are turned off to conserve battery power. As a result, processor functionalities are not available to start with. Output of a first inverter 716 is high, thereby disabling the Preset (Pr') input of the D flip-flop 701. The same signal is also used to disable the receiver in the Wireless Modem 302, ensuring total protection against remote hacking.

A Power-on-reset (POR) circuit (not shown) pulls POR line 703 of the first OR gate 702 temporarily high after power is first applied. This clears the D flip-flop 701 making its output Q low. Low Duty Cycle Oscillator (LDCO) 708 creates a square wave with high state in order of milliseconds, and low state in order of hundreds of milliseconds, making the duty cycle 1% or less.

As Processor Unit 305 is still not powered up, signal 712 from Processor Unit 305 stays low making output from second OR gate 713 just a delayed version of output from 708. As the D flip-flop 701 clocks in the rising edge, presence of second inverter 714 ensures clocking on the falling edges generated by 708. If the door is not open and no Fob is presented to Electronic Lock 106, output from third OR gate 704 is low and therefore output Q of 701 continues to stay low. As a result, the output 715 from fourth OR gate 709 merely follows the same pattern as output from LDCO 708 except for a small delay. During high state of 715, both Door open/close sensor 303 and Fob detector circuit in 304 (not shown) are enabled. Essentially, the above sensors are operating in a sampled rather than a continuous mode. If any of the outputs from above sensor produces a high, output of OR gate 704 presents a high at the 'data' input of 701, and at the falling edge of output 708, the output Q of 701 latches high. Q of 701 stays high till the first falling edge at output of 708 (plus propagation delay) after output of 704 becomes low again. While Q of 701 is high, output from inverter 717 is low and PMOS transistor 711 is turned on to provide power to Processor Unit 305. The Processor Unit 305 performs its routine like analyzing received Fob code, generating alarm and sending messages through wireless modem if necessary. After its routine is over, 305 pulls 'Processor OFF' line 707 high, thereby clearing 701 through the NOR gate 702 and Clear (Clr') line of 701. Output Q of 701 becomes low and output of 717 becomes high, charging capacitor 718 through resistor 710. As a result, Processor Unit 305 and Wireless Modem 302 are turned off after a finite delay (determined by time constant of 710 and 718) since 707 is pulled high.

Thus, the Power Management Unit 307 makes sure that while sensors 303 and 304 operate in a sampled manner, the Processor Unit 305 and Wireless Modem 302 are turned on only on demand. Moreover, after serving its routine, Processor Unit 305 turns off all circuitry (including itself) except for ones running 24/7. The circuit operating 24/7 is implemented with LDCO 708, D Flip flop 701 and gates 716,713, 714, 715, 704,702 and 717. As none of the above operates in high speed, the total circuitry running 24/7 consumes very little current.

When the switch 309 is in 'Install' position, the Preset (Pr') input of the D flip-flop 701 is active and sets Q of 701 high, thereby turning on the Processor Unit 305 and Wireless Modem 302. In other words, all the circuitry in Electronic Lock 106 is now running continuously with no power saving being available. This mode is useful in provisioning the system, viz. programming Fob codes, telephone numbers etc. before being set to the normal 'Run' mode.

Figure 8:
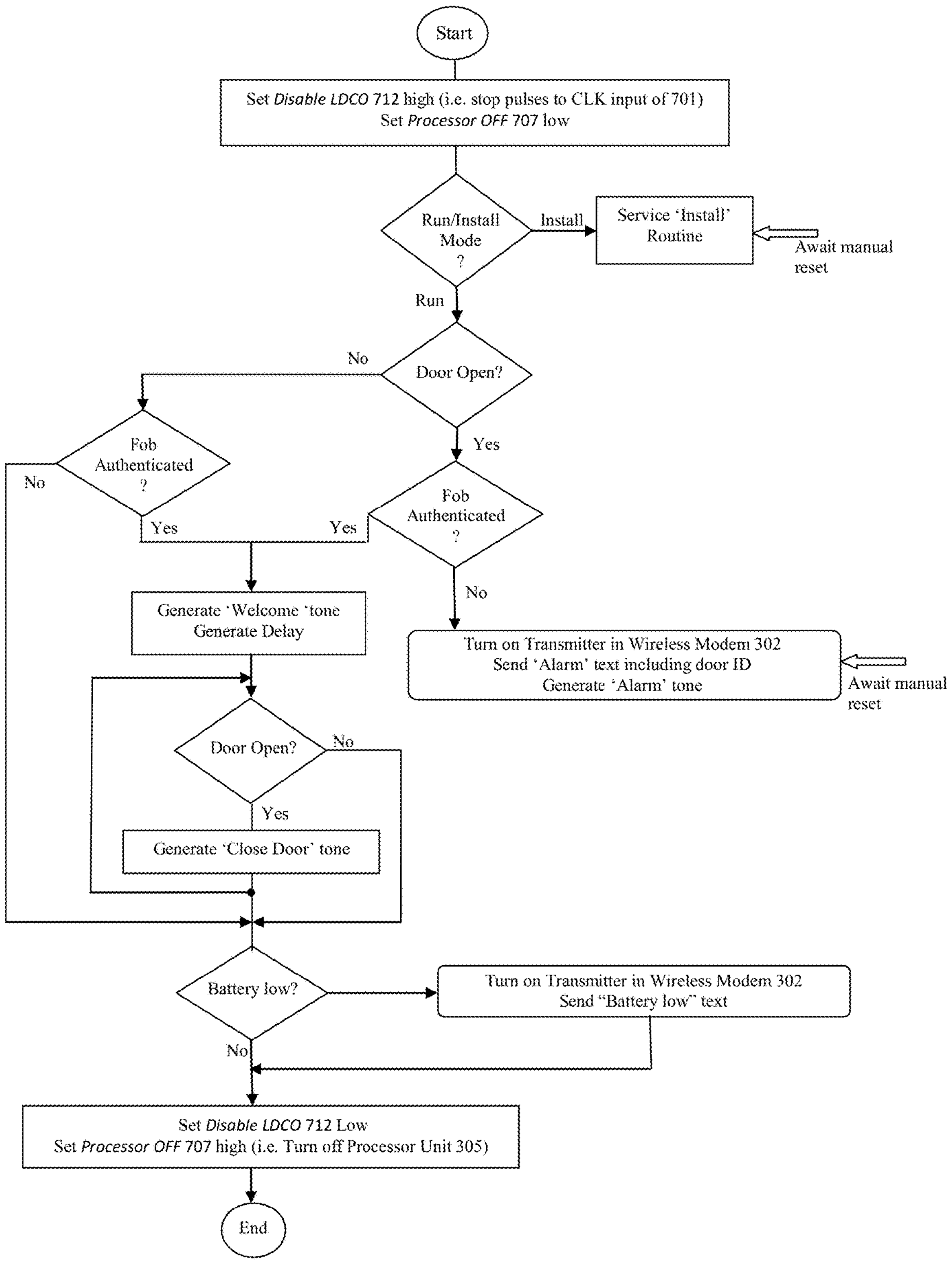
FIG. 8 depicts flowchart for the decision algorithm.

The accompanying FIG. 8 depicts a flow chart describing the overall decision process once the door is found open, and/or a fob is detected. As explained with respect to the FIG. 7, this condition turns on Processor Unit 305 to service a routine whose algorithm is described in FIG. 8.

Figure 9:
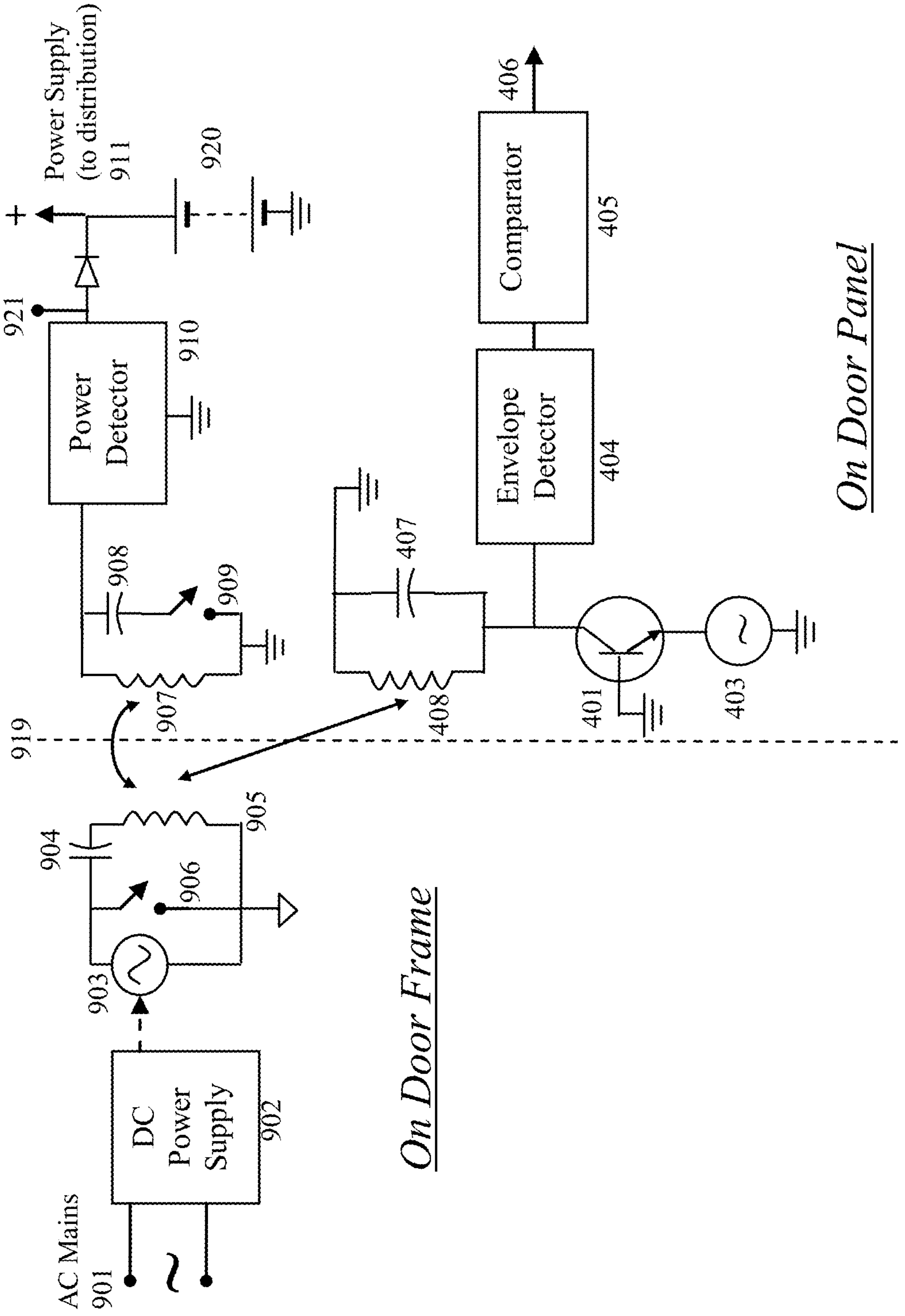
FIG. 9 depicts scenario of Electronic Lock powered by AC Power via Wireless Transfer of Power.

The accompanying FIG. 9 depicts an alternative embodiment of the Electronic Lock 106 that can be powered by AC mains supply. Since Electronic Lock needs to be installed on a moving door panel (installing on a fixed door frame usually does not allow the Fob to be brought into close enough range of the Electronic Lock), extending a wire to the Electronic Lock is cumbersome. This problem can be solved by using Wireless Transfer of Power (WTP). Interestingly enough, the WTP scheme can also be used to double as a Door open/close sensor. An imaginary dotted line 919 divides FIG. 9 into two parts. To the left of 919 contains circuitry mounted on the physically static door frame. To the right is the circuitry mounted on the moving door panel, i.e., part of the Electronic Lock 106. The two circuits are completely isolated except for magnetic coupling between multi-turn inductors 905 and 907.

The AC Mains 901 energizes a DC power supply 902 used to power a radio-frequency (RF) generator 903—similar to 403 in FIG. 4. A RF (analog) switch 906 with NC (normally close) contact opens up when DC power is applied. As a result, RF current flows through the resonant circuit consisting of capacitor 904 and inductor 905. During wireless transfer of power, RF (analog) switch 909 is kept closed. As a result, inductor 907 (on the door panel side), together with capacitor 908 constitute a resonant circuit feeding the power detector circuit 910. DC voltage 911 generated by 910 is used to power the entire Electronic Lock 106 as well as charge a secondary battery 920. If the door is opened, output voltage 921 from 910 goes down, and can be used with a comparator (not shown) to detect open/close condition.

In case of power outage, Electronic Lock 106 operates from standby battery 920 as before. 921 cannot be used as an open/close sensor under such a condition, and therefore open/close sensor of FIG. 4 is used (open/close sensor of FIG. 4 stays inactive while AC power is available). For convenience the open/close sensor of the FIG. 4, consisting of 407, 408, 401, 403, 404 and 405 is reproduced in the FIG. 9. Under power outage condition, while the open/close sensor is activated by signal 715 (FIG. 7), switch 909 is also made to open and switch 906 reverts to close state due to lack of DC power. As a result, there is negligible loading effect from inductor 907, whereas 904 and 905—in conjunction with 906 form a resonant circuit as in 107. Therefore, open/close sensor of FIG. 4 operates as before.

Figure 10:
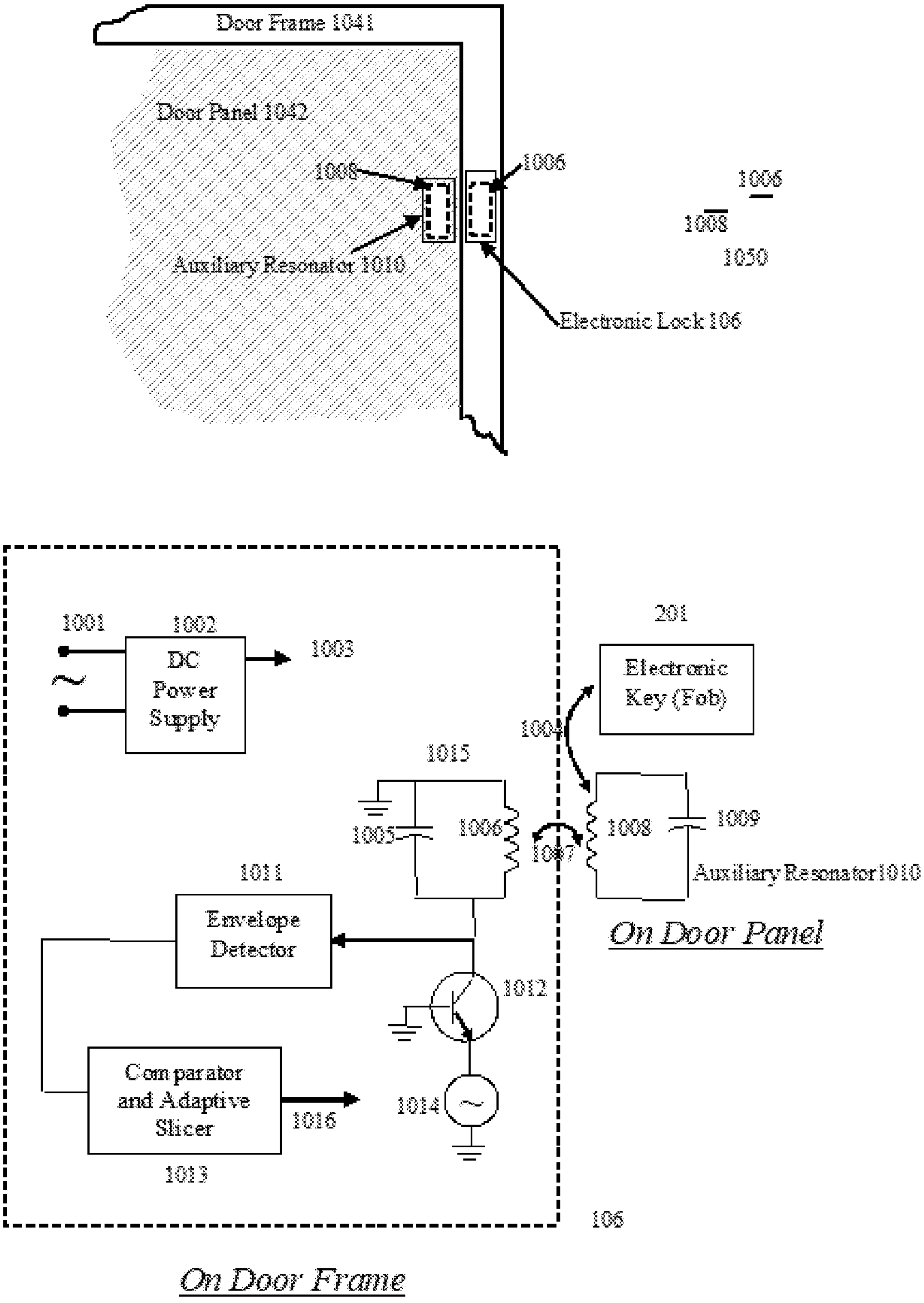
FIG. 10 depicts scenario of Electronic Lock using an Auxiliary Resonator

The accompanying FIG. 10 depicts another embodiment of the Electronic Lock 106 that can be powered by AC mains supply. Normally Electronic Lock needs to be installed on a moving door panel 1042 (installing on a fixed door frame 1041 usually does not allow the Electronic Key Fob to be brought into close enough range of the Electronic Lock), and extending a wire to the Electronic Lock on the door frame 1042 is cumbersome. This problem can be solved by using a 'Auxiliary Resonator' 1010, to distinguish itself from the first and second resonators 502 and 602 (in FIG. 5 and FIG. 6 respectively), present in the Authentication Sensor 304 and Electronic key 201 respectively. The 'Auxiliary Resonator' 1010, consisting of a printed or copper wire based multi-turn planar spiral inductor 1008 and capacitor 1009 is installed on the moving door panel 1042. The Electronic Lock 106 in its entirety can then be installed on the door frame 1041, and yet authentication carried out successfully using the 'Auxiliary Resonator' 1010 as a passive repeater between Electronic Lock 106 and Electronic Key 201.

The AC Mains 1001 energizes a battery backed DC power supply 1002 used to power the Electronic Lock 106 in its entirety. A tuned amplifier is created using a transistor 1012 and resonant circuit 1015, consisting of printed or copper wire based multi-turn planar spiral inductor 1006 and capacitor 1005. Biasing may be done away from linear mode to save power if some sensitivity can be sacrificed. The diagram shows a bipolar transistor though a field-effect transistor or a similar device may be used instead. In the present embodiment, the amplifier is common base (common gate), though other configurations (e.g., common emitter/common source) are possible. Common base/common gate is preferred as they provide better overall sensitivity due to reduced loading by the active device 1012, which is excited by a Radio Frequency (RF) source 1014 that can be implemented as a stable oscillator with output buffer. There is a provision to amplitude modulate 1014, whereby data from the Electronic Lock 106 can be transmitted to the Electronic Key 201 via the 'Auxiliary Resonator' 1010, using mutual inductance 1007 between inductors 1006 and 1008, and the mutual inductance 1004 between inductors 1008 and 601 (FIG. 6). An example of this data is a random number generated by the Electronic Lock 106. The Electronic Key 201 is powered by magnetic field generated by the inductor 1006 of the resonant circuit 1015, via the Auxiliary Resonator 1010, again utilizing the mutual inductances 1007 and 1004. Data from Electronic Key 201 is transmitted to Electronic Lock 106 by load modulation at Electronic Key 201, also using the 'Auxiliary Resonator' 1010 as a passive repeater as before. As a result, the effective RF load at the collector/drain of 1012 is modulated according to the load modulation, modulating the RF voltage at the collector/drain of 1012. Envelope detector 1011 generates the envelope of this RF voltage containing the load modulation information, but also contains a DC component depending on the distance and orientation (i.e., effective magnetic coupling due to mutual inductances 1007 and 1004) of 201 with respect to 1008. An adaptive slicer 1013 recovers the modulation irrespective of the undesired DC component and converts to digital data 1016, which is ideally same as the data generated by Electronic Key 201. Thus, both upstream (201 to 106) and downstream (106 to 201) communication is effected between Electronic Lock 106 and Electronic Key 201, using the Auxiliary Resonator 1010 as a passive repeater.

The mutual inductances 1007 and 1004 thus play an important role in the powering of the Electronic Key 201, as well data transmission up and downstream between Electronic Lock 106 and Electronic Key 201. The mutual inductance between 1006 and 601 (FIG. 6) in Electronic Key 201 is negligible. It is emphasized that resonators 1008 and 1006 are not necessarily in the same plane, demonstrated by the side view 1050.

The 'Auxiliary Resonator' 1010 can also be used to sense the door open/close condition. When the door panel 1042 is opened, mutual inductance 1007 becomes small, resulting in a large output from Envelope Detector 1011. This output is significantly larger than the average output from 1011 when Electronic Key is in proximity of Auxiliary Resonator 1010. This feature may be used distinguish between the door open/close condition and presence of an Electronic Key.

Figure 11:
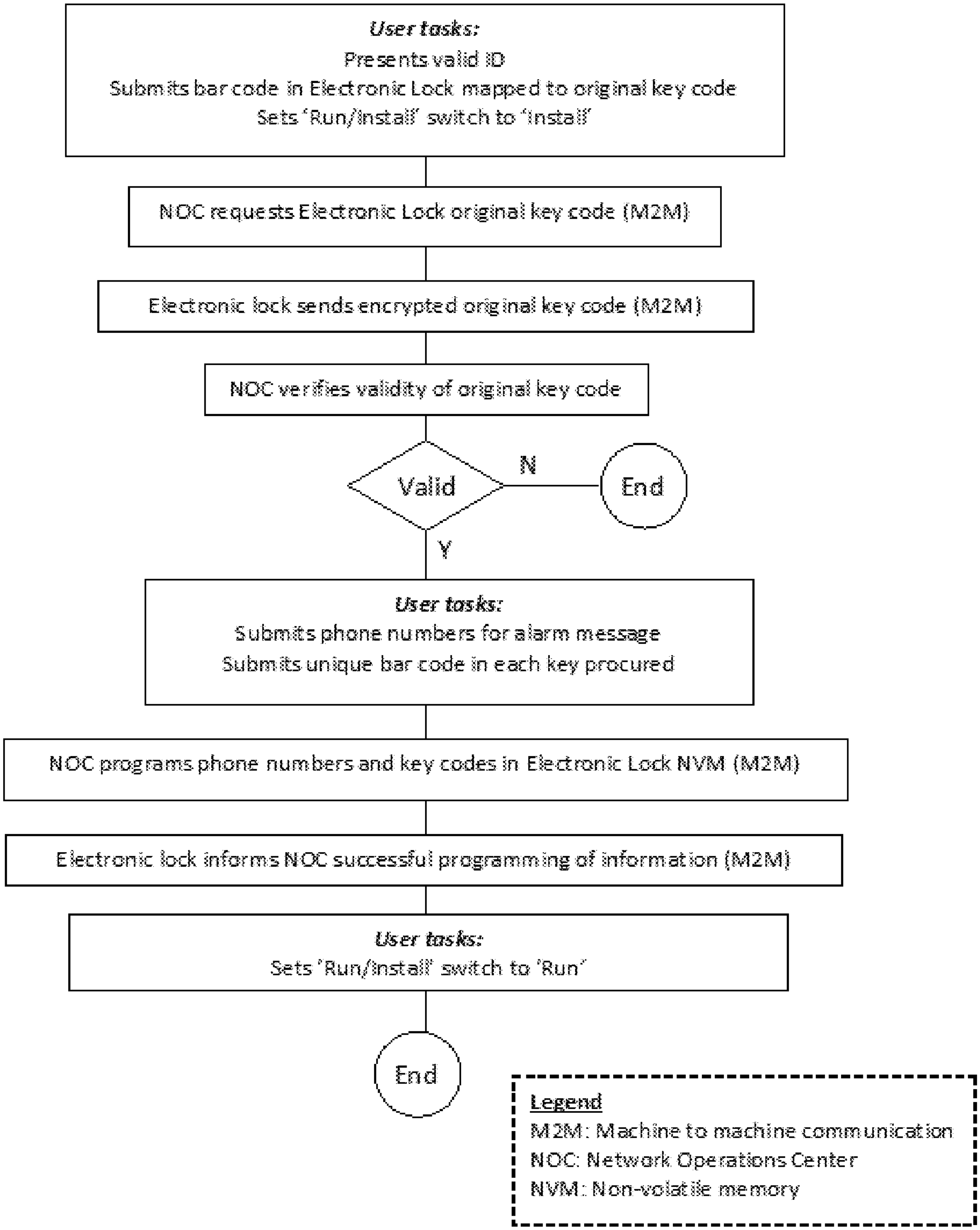
FIG. 11 depicts flowchart for Remote Provisioning of the Electronic Lock.

The accompanying FIG. 11 depicts a flow chart describing the overall decision process for remote provisioning (i.e., configuring parameters) of the Electronic Lock 106. During remote provisioning, phone numbers for sending warning messages, as well as key codes (e.g., for lost/misplaced fob) can be entered.

Figure 12:
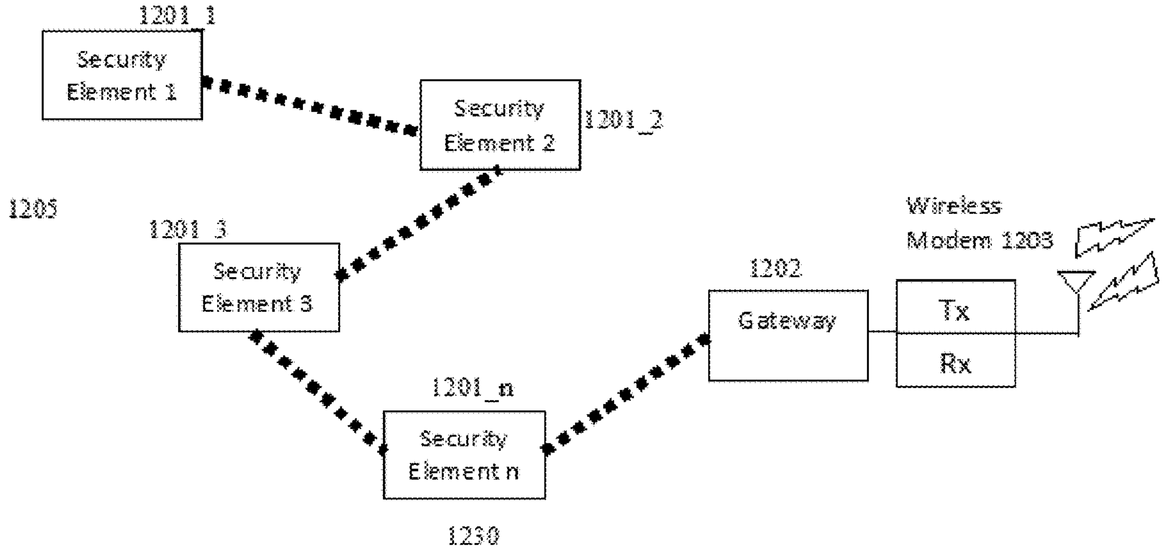
FIG. 12 depicts block diagram of networked multiple Security Elements.
Figure 12:
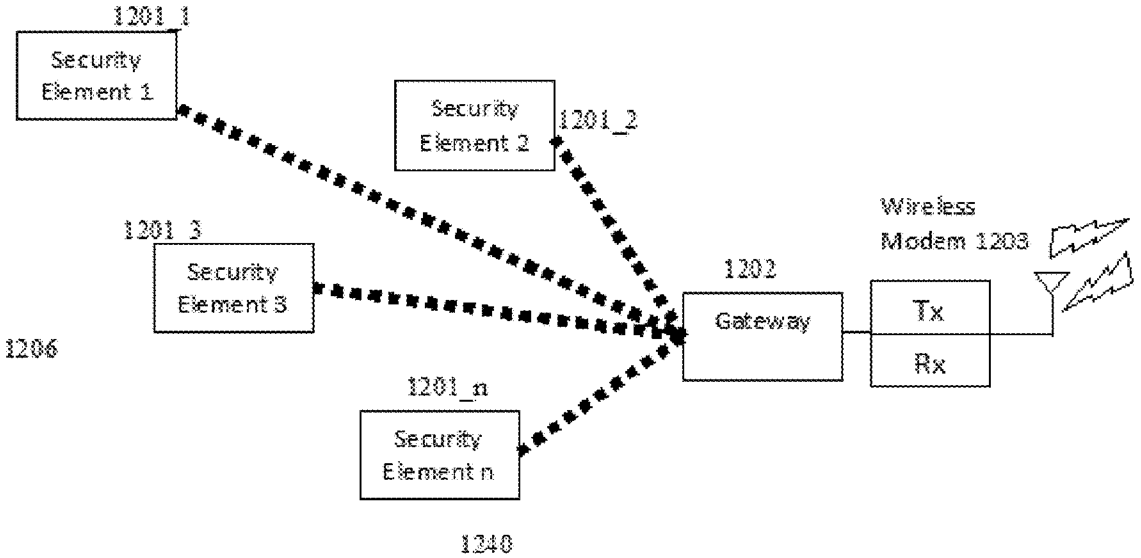

Integrating various sensors like Camera, Temperature Sensors, Smoke Detectors, Motion Sensors etc. with the Electronic Lock 106 convert them into versatile Security Elements, and multiple such Security Elements can be connected in a network to cover an entire premise. The accompanying FIG. 12 depicts two embodiments for connecting multiple Security Elements 1201_* in a network.

In 1230, The Security Elements 1201_1 through **1201_*n* can be networked using a self-configuring mesh network. One or more Security Elements communicate directly to a Gateway 1202 that contains a wireless modem 1203 for backhaul. The Gateway 1202 might also contain audio generator (not shown) for generation of centralized audio alarm. Multiple Security Elements 1201_1 through 1201_*n* can also be networked using a star topology 1240 whereby the Gateway 1202 acts as a central device controlling multiple Security Elements 1201_1 through 1201_*n***.

The Gateway 1202 may or may not incorporate a Security Element or parts of it.

What is claimed is:

1. A locking system for a portal to enable its authorized user aware on unlawful opening of such portal, the locking system comprising:

an electronic lock for secured internal installing on a fixed portion of the portal;

an auxiliary resonator for mounting on a movable portion of the portal, the auxiliary resonator is configured to wirelessly interact with the electronic lock and one or more of electronic keys;

each electronic key on close proximity with the auxiliary resonator is wirelessly energized for communication with the electronic lock via the auxiliary resonator including transmission of unique embedded code of the electronic key to the electronic lock; and the electronic lock involves a processor unit to match and authenticate the electronic key code by matching the electronic key code with pre-programmed codes and generate status of portal opening without electronic key or with electronic key but without matching key code;

at least one authentication cum open-close sensor in the electronic lock for wireless interaction with the electronic key on proximity with the auxiliary resonator involving the auxiliary resonator as passive repeater, while a change in wireless interaction between the auxiliary resonator and the authentication cum open-close sensor as the auxiliary resonator moves sufficiently far away from the authentication cum open-close sensor facilitates determination of open-close condition of the portal;

wherein the authentication cum open-close sensor comprises:

a resonant circuit comprising of a multi-turn planar spiral inductor and a parallel capacitor, the inductor generates a magnetic field directed to the auxiliary resonator for mutual inductance based power transfer and wireless communication with the auxiliary resonator involving mutual inductance between the inductor of the authentication cum open-close sensor and the inductor of the auxiliary resonator and further mutual inductance based power transfer and wireless communication with the electronic key involving the mutual inductance between the inductor of the auxiliary resonator and inductor of the electronic key;

a cooperative transistor based tuned amplifier having the transistor under common base/common gate configuration and a radio frequency source capable of amplitude modulation to excite the transistor, enabling transfer of power and transmission of data from the authentication cum open-close sensor to the electronic key via the auxiliary resonator, wherein data from the electronic key is transmitted to the authentication cum open-close sensor via the auxiliary resonator by load modulation including modulation of effective RF load at collector/drain of the transistor and modulation of the RF voltage at the collector/drain of the transistor;

an envelope detector to generate envelope of the RF voltage containing the load modulation information and also a DC component depending on distance and orientation of the electronic key with respect to the inductor of the auxiliary resonator;

an adaptive slicer to recover the load modulation information irrespective of the DC component and convert to digital data equivalent to the data generated by the electronic key:

a cooperative comparator to generate logic level signal depending on the voltage from the envelope detector indicating the door open/close condition created by moving the auxiliary resonator sufficiently far away from the resonant circuit of the authentication cum open-close sensor;

wherein the processor unit, on detection of the portal opening through said at least one authentication cum open-close sensor without receiving the key code or without matching of the received key code with any of the pre-programmed codes, generates an audio alarm signal and send warning message to one or more of authorized users of the portal using a wireless network.

2. The locking system as claimed in claim 1, wherein the auxiliary resonator is mounted on moving portal panel adapted to be read through the portal panel material whereby the electronic Lock in its entirety is installed on static portal frame externally unnoticeable and powered by battery backed AC mains supply.

3. The locking system as claimed in claim 1, wherein the auxiliary resonator includes a printed or copper wire based multi-turn planar spiral inductor and a parallel capacitor.

4. The locking system as claimed in claim 1, wherein the electronic lock further comprises:

at least one audio-generator to create various tones including welcome sound, intrusion alarm, instruction to close the portal;

at least one wireless modem to convey intrusion information to users' personal devices through a local or wide area wireless network; and a power management unit to optimize overall power consumption by the electronic lock.

5. The locking system as claimed in claim 4, wherein the power management unit optimizes overall power consumption of the electronic lock by periodically activating the authentication cum open-close sensor and activating the processor unit for requisite processing only when the portal open condition or presence of the electronic key is detected; and wherein the processor unit further activates the audio generator and the wireless modem depending on the requirement and turn off all the circuitry including itself on completion of the processing.

6. The locking system as claimed in claim 5, wherein the power management unit includes a mechanical switch accessible from outside of the electronic lock for switchable selection between optimizing the overall power consumption by electronic lock or running continuously all the circuitry of the electronic lock.

7. The locking system as claimed in claim 6, wherein the power management unit optimizes overall power consumption by the electronic lock by including:

the mechanical switch to select the normal power optimized operation of the electronic lock which turns off the sensors circuitry, processor, audio generator and the wireless modem in co-operation with a one-bit memory that assumes a certain state once power is applied and change to a different state if the sensors detect presence of an electronic key or portal open condition;

a Low Duty Cycle Oscillator (LDCO) to create a square wave with low duty cycle such as to wake up the sensors periodically;

the one-bit memory holding its changed state and maintain the processor turned on and further turn on the transmitter of the wireless modem depending on the output from the processor but keep the receiver disabled in the wireless modem ensuring total protection against remote hacking; and turn off sensors circuitry and the wireless modem on command from the processor and finally turn off the processor itself after a certain delay by the same command traveling through an analog delay.

8. The locking system as claimed in claim 1, wherein the electronic Key comprises:

a resonant circuit tuned to frequency generated by radio frequency source of the authentication cum open-close sensor consisting of the inductor and a capacitor, the inductor is magnetically coupled with the inductor of the authentication cum open-close sensor resonant circuit through the inductor of the auxiliary resonator circuit on their proximity to harvest power from the magnetic field generated by the inductor of the authentication cum open-close sensor resonant circuit for a power detector;

the power detector preferably an envelope detector or charge pump to generate higher voltages having capacitance to hold charge during the load modulation whereby DC voltage generated by the power detector is used to power the circuitry inside the key;

a fast envelope detector to detect the data transmitted from the electronic Lock via amplitude modulation;

converter to convert the detected signal into digital data;

non-volatile memory to store factory-programmed unique code of the key for processing by a processor and serially outputting; and an electronic switch for performing the load modulation to transmit the serially outputted data containing the unique code of the key in different transmitting bit patterns.

9. The locking system as claimed in claim 1, wherein the processor unit cooperates with the existing lock on the portal allowing the user a reasonable time to open the lock.

10. The locking system as claimed in claim 1, wherein the electronic lock is configured to convert output from sensors like camera, temperature sensors, smoke detectors, motion sensors into versatile security elements;

wherein multiple of the security elements are configured to be connected in a network to cover an entire premise; and wherein the security elements are configured to communicate directly to a gateway which contains a wireless modem for backhaul.

* * * * *